United States Patent [19]

Sperber

[11] Patent Number: 4,978,252

[45] Date of Patent: Dec. 18, 1990

[54] MATERIAL FEEDING APPARATUS USING PRESSURIZED AIR

[76] Inventor: Henry Sperber, 8 Red Fox La., Englewood, Colo. 80111

[21] Appl. No.: 362,874

[22] Filed: Jun. 7, 1989

[51] Int. Cl.$^5$ .............................................. B65G 53/40
[52] U.S. Cl. ........................................ 406/64; 406/65; 406/135; 198/532; 222/227
[58] Field of Search ....................... 406/38, 39, 64, 65, 406/113, 115, 116, 127, 134, 135; 198/532; 222/227

[56] References Cited

U.S. PATENT DOCUMENTS

| | | | |
|---|---|---|---|
| 725,588 | 4/1903 | Rehfuss et al. | 406/154 |
| 3,105,721 | 10/1963 | Collins et al. | 406/39 |
| 3,529,870 | 9/1970 | Woten | 406/65 |
| 4,111,493 | 9/1978 | Sperber | 406/65 |

Primary Examiner—Sherman Basinger
Assistant Examiner—Stephen P. Avila
Attorney, Agent, or Firm—Sheridan, Ross & McIntosh

[57] ABSTRACT

A feeder apparatus is provided for delivery of insulation material or the like using pressurized air, particularly where such material is relatively light and fluffy and/or delivered at a low rate. The feeder apparatus includes a hopper and a chute. The hopper receives the material, which is to be carried using the pressurized air. A chute housing a pair of tine assemblies receives the material from the hopper and is used in carrying the material to an inlet. The inlet is formed by first and second adjusting assemblies, which are located on opposite sides of the chute. The user is able to provide a desired size inlet by rotating crank handles of the two adjusting assemblies to cause linear movement of adjustable plates. Material passing from the inlet is received by a rotary pocket feeder having a number of vanes. Pressurized air is also delivered to the rotary pocket feeder. The pressurized air carries the material through an outlet formed in the pocket feeder for delivery to a predetermined site. Pressurized air is vented using air passageways formed adjacent to each of the two adjusting assemblies, which assemblies act to divert such air so that it does not cause unwanted blow back of material. In one embodiment, the material is insulation that is delivered in a fluffy constituency from the outlet to cavities formed in a wall structure of a building.

9 Claims, 2 Drawing Sheets

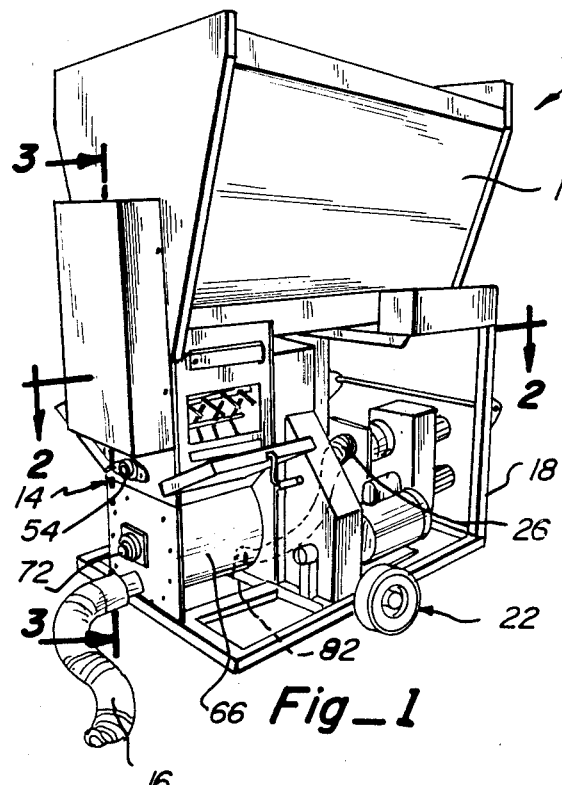
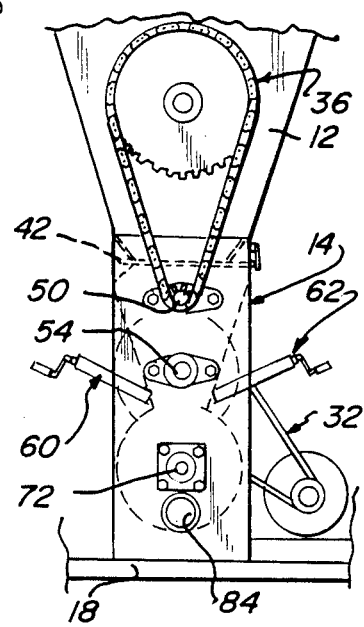
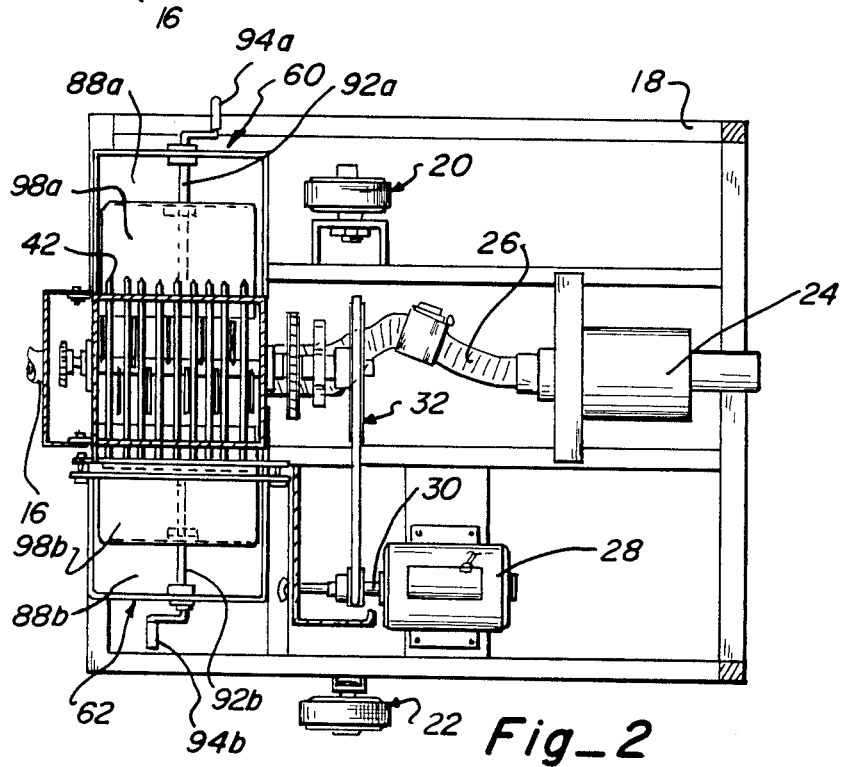

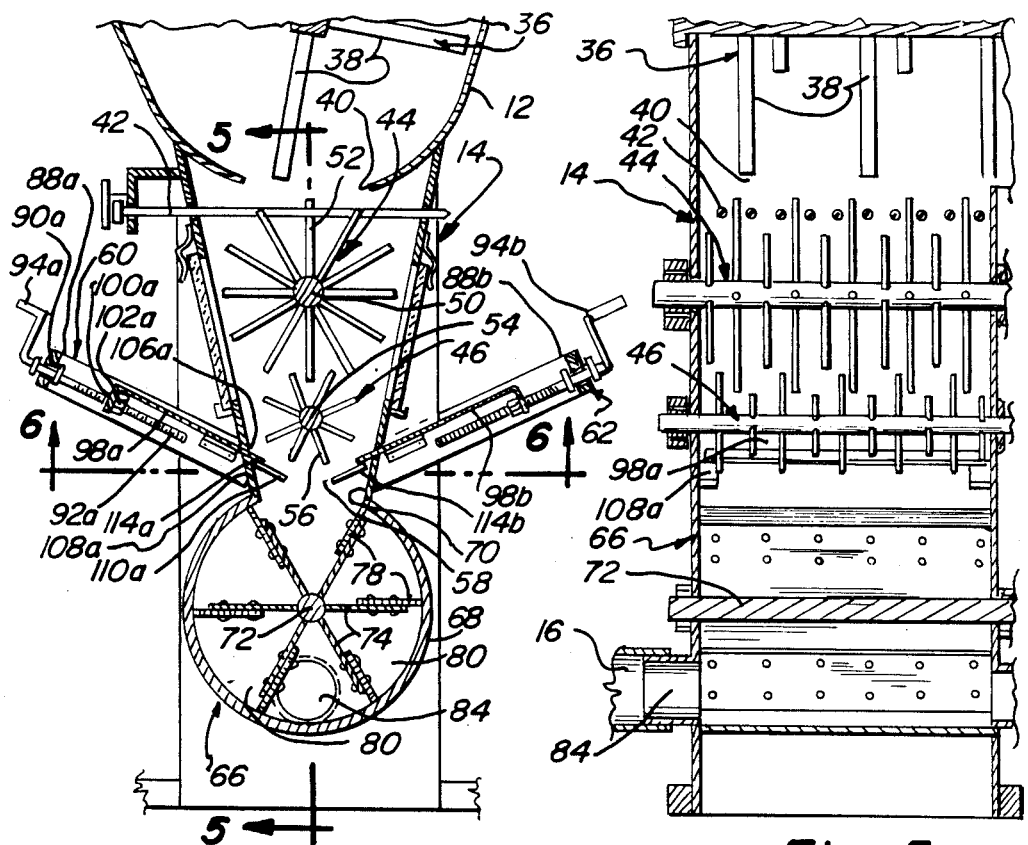
Fig_4    Fig_5
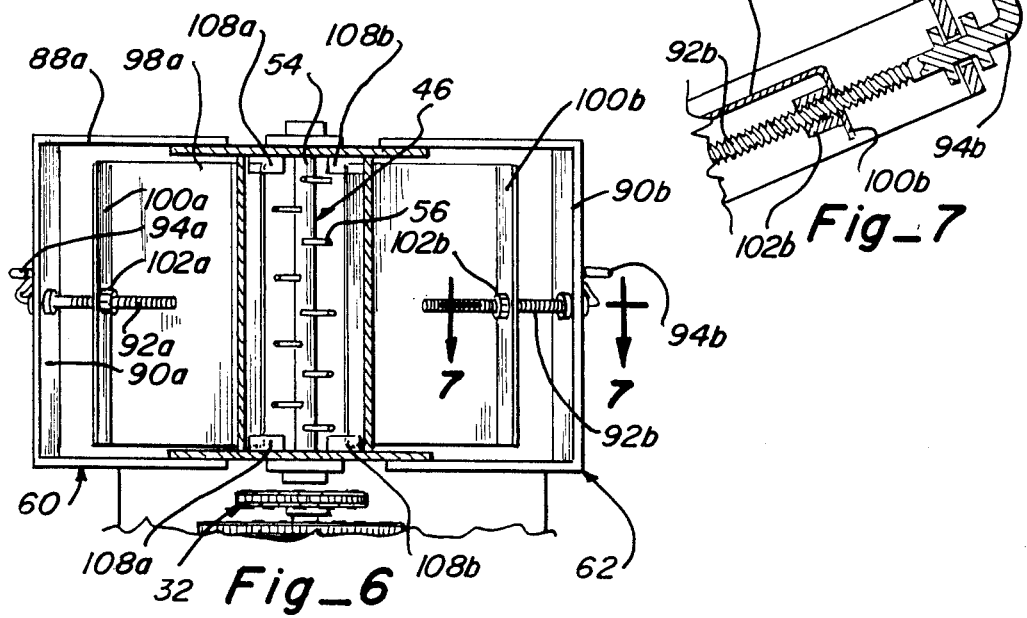
Fig_6    Fig_7

MATERIAL FEEDING APPARATUS USING PRESSURIZED AIR

FIELD OF THE INVENTION

The present invention relates to a feeding apparatus and particularly to an apparatus for conveying insulation, fireproofing, acoustical materials or the like using pressurized air.

BACKGROUND OF THE INVENTION

In connection with the conveying of loose insulation for receipt by cavities in a wall structure, an apparatus has been previously devised for delivery of the insulation so that it has a fluffy constituency when received by the wall cavity. This apparatus is disclosed in U.S. Pat. No. 4,111,493 to Sperber, issued on September 5, 1978, and entitled "Feeding Apparatus for a Pneumatic Conveying System." With regard to the operation of this apparatus, pressurized air is used in carrying the insulation from the apparatus. Some of the pressurized air does not exit the apparatus carrying the insulation, rather, it travels in a direction towards the incoming insulation leading to unwanted blow back of the insulation, i.e. the pressurized air tends to force the incoming insulation in a direction away from the exit or output area. In accordance with the apparatus disclosed in the aforesaid prior art patent, a vent opening is provided to define a passageway for such air so that blow back is eliminated, or at least reduced. The vent opening is formed in a front wall of a cylindrical rotary pocket feeder. The pocket feeder includes a number of vanes, each having a seal member attached at the ends of the vanes. As the vanes rotate, any pressurized air, that may have not exited with the insulation, is carried until it communicates with the vent opening, at which time the pressurized air is able to exit the rotary pocket feeder for the intended purpose of avoiding blow back. It has been observed, however, that under certain conditions this arrangement does not satisfactorily overcome the blow back problem. Specifically, when the material being delivered to the pocket feeder is relatively light and fluffier and/or the material particles are fed at a relatively low flow rate, blow back air interferes with material particle flow to an unacceptable level. That is, because the particles are lighter and fluffier and/or the particles fall at a slow rate, a relatively small amount or rate of blow back seriously impedes material flow into the pocket feeder. Consequently, the present invention is directed to providing at least one air passageway that results in a more acceptable and efficient escape of blow back air so it does not undesirably affect material particle flow into the pocket feeder.

In connection with this prior art apparatus, it has also been noted that the seal members tend to wear whereby more pressurized air than is desirable is able to escape past the seal members between the vanes. As a result, greater amounts of air are available for contributing to the blow back problem. That is, not all such air escapes via the vent opening but some may flow through the inlet that receives the incoming material Thus, it would also be advantageous to provide a feeding apparatus that circumvents this concern relating to the wear of the seal members.

Relatedly, the apparatus of the '493 patent utilizes a single wall member and a control member to pivotally move the wall member and thereby adjust an inlet opening formed in the chute to the rotary pocket feeder. This construction is not a satisfactory solution to the blow back problem when lighter and fluffier particles are utilized. Consequently, a more accommodating inlet adjusting assembly is necessary in which air can pass or be vented adjacent to the inlet adjusting assembly.

SUMMARY OF THE INVENTION

A feeding apparatus is disclosed for providing benefits and advantages over the feeding apparatus disclosed in U.S. Pat. No. 4,111,493 of the same inventor and the disclosure of which is hereby incorporated by reference. In particular, an improved feeding apparatus is provided that includes a rotary pocket feeder that does not have a vent opening formed in the cylindrical body for venting pressurized air; rather, air passageways are formed using inlet adjusting assemblies.

The pocket feeder includes a number of vanes that extend along the length of the cylindrical body that houses the vanes. The body has a channel or opening provided at a top circumferential portion of the body to receive the fed material To control the amount of material, such as insulation, being fed into the channel, first and second inlet adjusting assemblies are provided on opposite sides of the channel to create an inlet through which material passes into the pocket feeder through the channel Each of the two adjusting assemblies has like parts. Each adjusting assembly includes a cover plate and an adjustable plate, which is movable relative to the cover plate to control or vary the size of the inlet. In conjunction with causing movement of the adjustable plate, a crank handle and an elongated screw connected thereto are provided. The adjusting screw is connected to the adjustable plate and movement of the screw using the crank handle causes movement of the adjustable plate. The angle formed by the first and second adjusting assemblies remains substantially constant, regardless of the size of the inlet. In the preferred embodiment, the angle formed by the two adjusting assemblies is about 120°. The two adjusting assemblies are also provided so that air passageways are created adjacent to the two assemblies so that pressurized air that might not accompany material exiting the pocket feeder is able to escape or be vented past one or both of the adjusting assemblies and thereby avoid unacceptable blow back, even when lighter and fluffier materials are being used. The position and angles of the plates are chosen to optimize or enhance diversion of the blow back air so it does not detrimentally impact the flow of relatively lighter and fluffier material into the pocket feeder.

The remaining components of the present invention are comparable to those disclosed in the aforesaid U.S. Pat. No. 4,111,493. A pair of rotating tine assemblies are provided in the chute above the inlet adjusting assemblies and are used in delivery of the fluffy material to the pocket feeder A number of rod members extend laterally across the top of the chute adjacent to the upper tine assembly and are used in regulating the flow of the fluffy material as it passes into the chute. A hopper is disposed on top of the chute and has a rotary conveyer positioned therein for moving or carrying the fluffy material so that it is directed downwardly into the chute.

In view of the foregoing summary, a number of salient features of the present invention are readily discerned. A feeding apparatus using pressurized air is provided in which lighter and fluffier material particles, or particles at a relatively low rate, can be fed without real concern about the blow back problem. The amount of material delivered to a feeder is controlled using a pair of oppositely positioned adjusting assemblies. The adjusting assemblies maintain substantially the same preferred angle regardless of the size of the inlet and each is moved in the direction desired by the operator to create a predetermined inlet size. The area adjacent to the adjusting assemblies in the chute of the apparatus is configured to permit desired venting or escape of residual amounts of pressurized air to overcome the blow back problem. Because of this configuration, no vent opening need be provided in the cylindrical body or walls of the rotary pocket feeder, from which insulation or other material exits. Consequently, blow back of material into the chute is reduced using the configuration of the present invention and without need for a separate vent opening in the pocket feeder.

Additional advantages of the present invention will become readily apparent from the following discussion, particularly when taken in conjunction with the accompanying drawings.

BRIEF DESCRIPTION OF THE DRAWINGS

FIG. 1 is a perspective view of the feeding apparatus of the present invention;

FIG. 2 is a lateral section, taken along lines 2—2 of FIG. 1, illustrating the tine assemblies and the adjusting assemblies, as well as hardware components for rotating the tines and for providing pressurized air;

FIG. 3 is a fragmentary, longitudinal section, taken along lines 3—3 of FIG. 1, showing portions of drive mechanisms for rotating the conveying mechanism and tine assemblies, as well as the relative positioning of the two adjusting assemblies;

FIG. 4 is a fragmentary, longitudinal section illustrating the various assemblies located in the chute, particularly the two adjusting assemblies and the creation of an inlet through which material can be delivered to the rotary pocket feeder;

FIG. 5 is a longitudinal section, taken along lines 5—5 of FIG. 4, showing another view of the relationship and relative locations of the various assemblies provided in the chute;

FIG. 6 is a lateral section, taken along lines 6—6 of FIG. 4, showing an upwardly looking view of the two adjusting assemblies and their positions relative to the lower tine assembly for one position of the two adjusting assemblies; and FIG. 7 is an enlarged, fragmentary view, taken along lines 7—7 of FIG. 6, further illustrating portions of the adjusting assembly.

DETAILED DESCRIPTION

In accordance with the present invention and with reference initially to FIG. 1, a material feeding apparatus 10 is provided for use in delivery of insulation, acoustical, fireproofing or other like material under the force of pressurized air. The feeding apparatus 10 includes a hopper 12 for receiving the material to be fed or delivered to a desired location in which the material typically is to maintain a fluffy condition or constituency using the pressurized air that carries the material. A chute 14 is connected to and communicates with an opening in the bottom of the hopper 12. The chute 14 includes a number of components, which will be discussed in greater detail with reference to other drawing figures. The material is delivered to the bottom of the chute 14 where it exits the chute 14 by means of a flexible material-carrying hose 16. The hopper 12 and the chute 14 are supported by frame 18 having first and second wheel assemblies 20, 22, respectively (see FIG. 2). Also supported by the frame 18 are a number of other components used in the delivery of the material under the force of pressurized air. In particular, with reference also to FIG. 2, an air compressor 24 is supported by the frame 18 at an end thereof opposite from the end supporting the chute 14. The air compressor 24 acts to provide the pressurized air for carrying the material. An air hose 26 communicates with the output of the air compressor 24 and carries the pressurized air to the bottom of the chute 14. In connection with driving the rotating assemblies associated with movement of the material through the chute 14, a power drive device 28, such as a gasoline powered internal combustion engine, is provided having a drive shaft 30 for causing movement of a pulley drive assembly 32. With reference to FIGS. 3-5, the pulley drive assembly 32 provides the link for rotating or driving a number of rotating assemblies that are used in delivery of material through the chute 14, while maintaining the material in a desired fluffy condition. Specifically, contained within the hopper 12 is a rotating conveyor 36 having a number of arms 38, which extend to, but do not contact the inner walls of the hopper 12. Formed at the bottom of the hopper 12 is an outlet area 40 through which the material passes to the chute 14. Positioned just below the outlet area 40 are a number of rod members 42, which extend laterally across the chute area 14. The rod members 42 act to regulate and restrict the flow of material in the chute 14 and the number of rod members 42 can be varied as desired. Also located in the chute 14 are two tine assemblies 44, 46, which are used in assisting the conveyance of the material being fed through the chute 14, while maintaining the fluffy constituency of the material. The upper or larger tine assembly 44 is located just below the rod members 42 and includes a rotatable tine shaft 50 supported by the walls of the chute 14 and a number of tine members 52 that extend outwardly from the shaft 50 and terminate adjacent to inner wall sections of the chute 14. Similarly, the lower or smaller tine assembly 46 includes a rotatable shaft 54 having a number of tine members 56 extending outwardly therefrom and terminating at some desired distance from wall sections of the chute 14. The lower tine assembly 46 is smaller in size than the upper tine assembly 44, i.e., the tine members 56 are shorter than the tine members 52 and the shaft 54 has a smaller diameter than the shaft 50. Further, the shafts 50, 54 are in substantially vertical alignment, namely, they lie in substantially the same vertical plane.

With reference particularly to FIG. 4, material carried or passed by the lower tine assembly 46 next passes through an inlet 58, which is a variable size, elongated opening. The size of the inlet 58 is regulated using first and second adjusting assemblies 60, 62, which will be explained in greater detail subsequently herein. The inlet 58 communicates with a rotary pocket feeder assembly 66. The feeder assembly 66 includes a cylindrical body or casing 68 having a channel opening 70 formed along the top portion of the casing 68. Provided within the casing 68 is a rotatable shaft 72 and a number of vane members 74 that extend outwardly from the shaft 72 towards the inner wall of the casing 68. For each vane member 74, a seal member 78 is connected, by conventional means, to end portions of each vane member 74. Each of the seal members 78 extends to the inner wall of the casing 68 whereby ends of the seal members 78 engage or contact the inner wall of the casing 68 for the purpose of providing a seal so that an acceptable air seal is formed among pockets 80 of the feeder assembly 66. Each pocket 80 is defined as the area between two of the vanes 74 and their accompanying seal members 78. Formed near the bottom of the casing 68, in a rear end wall thereof, is an inlet 82 (see FIG. 1) for receiving the pressurized air carried by the air hose 26. An outlet 84 is formed in the bottom of the casing 68, in the front end wall thereof, and is in substantial alignment with the inlet 82. The pressurized air exiting the inlet 82 into the interior of the casing 68 forces or carries material received by the feeder assembly 66 into the outlet 84, where it is then carried or delivered by the material-carrying hose 16. Unlike the prior art feeding apparatus disclosed in the aforesaid prior art U.S. Pat. No. 4,111,493, there is no vent opening formed in the walls or ends of the casing 68.

With regard to the assemblies 60, 62 for creating or varying the size of the inlet 58, reference is made to FIGS. 6-7, as well as FIGS. 2 and 4. The first adjusting assembly 60 is located on one side of the chute 14, while the second adjusting assembly 62 is positioned on the opposite side of the chute 14. Each of the adjusting assemblies 60, 62 has equivalent parts and, therefore, a discussion of the first adjusting assembly 60 will be in greater detail but with such discussion also applying to the second adjusting assembly 62. The adjusting assembly 60 includes a shell or cover plate 88a having a front face 90a. A hole is formed in the front face 90a so that an elongated adjusting screw or bolt 92a can be inserted therethrough. The screw 92a is operably connected to a crank handle 94a. The first adjusting assembly 60 also includes an adjustable plate 98a, which is disposable within the shell 88a but is also movable relative thereto. That is, the adjustable plate 98a has a front face 100a with a hole for receiving portions of the screw 92a. The screw 92a is movably connected to the front face 100a by means of a nut 102a. Movement of the crank handle 94a results in movement of the adjustable plate 98a relative to the cover plate 88a. An opening 106a is formed in a wall portion 108a of the chute 14 for receiving portions of the adjustable plate 98a into interior portions of the chute 14. In conjunction with such movement, two guide or support members 110a are provided and connected to opposite side wall portions 108a for receiving end portions of the adjustable plate 98a to support and guide the same during movement towards or away from the interior portions of the chute 14 for the purpose of creating or providing the inlet 58. The support members 110a are like angled brackets having a small extent across the chute 14, in comparison with the length of the adjusting plate 98a, as best seen in FIG. 6. An air passageway 114a is defined or formed adjacent to the bottom surface of the adjustable plate 98a and permits air to escape from the feeder assembly 66 and out of the opening 106a to exit the chute 14. Consequently, the air passageway 114a serves a purpose comparable to the vent opening found in the aforesaid prior art U.S. Pat. No. 4,111,493.

With regard to the second adjusting assembly 62, parts comparable to the parts of the first adjusting assembly 60 are identified using the same reference numbers that identified the parts of the first adjusting assembly 60 but, instead of the identifying reference letter "a", the identifying reference letter "b" is used. As can best be seen in FIG. 4, the two adjusting assemblies 60, 62 together form a V-shape or angle for defining the inlet 58. Preferably, the angle formed by the two adjusting assemblies 60, 62 is 120°. It is also preferred that, in defining the inlet 58, both of the adjustable plates 98a, 98b be linearly moved or adjusted equivalent amounts so that material entering the formed inlet 58 will be received at center or midportions of the channel 70 formed in the casing 68. The width of the inlet 58, in one embodiment, can be varied between about ¼ inch to 3 inches, with a 1 inch width opening being typical where the material being fed to the feeder assembly 66 is a fluffy, insulation material.

The positioning and angles formed by the adjusting assemblies 60, 62 form a preferred V-shape arrangement for diverting any pressurized air so that it escapes via one or both air passageways 114a, 114b, instead of such air passing into the inlet 58, which would cause unwanted interference with material flowing downwardly, which is opposite the direction of the blow back air.

In using the feeding apparatus 10, material, such as insulation, is fed or delivered into the hopper 12 and caused to be moved through the outlet area 40 using the arms 38 of the rotating conveyor 36. The material movement is controlled by the rod members 42 before engaging the upper tine assembly 44 and then the lower tine assembly 46. From the bottom of the lower tine assembly 46, the material moves through the inlet 58.

The size of the inlet 58 was defined or created by the operator before starting operation of the apparatus 10, including causing the conveyor 36 and the first and second tine assemblies 44, 46 to rotate. In that regard, the operator moves the adjustable plates 98a, 98b in either a direction towards or away from interior portions of the chute 14 by turning the crank handles 94a, 94b in either a clockwise or counter-clockwise direction. As previously noted, it is preferred that the amount of movement of each adjustable plate 98a, 98b be substantially the same so that the inlet 58 is centered about the channel 70. As can be understood, even though the operator is able to adjust the position of the adjustable plates 98a, 98b within the interior of the chute 14, the angle formed by the adjusting assemblies 60, 62 remains substantially the same.

After passing through the predetermined size inlet 58, the insulation is received by the rotary pocket feeder 66 and carried by the vanes 74 towards the outlet 84. At the same time, pressurized air is being supplied to the pocket feeder 66 through the inlet 82 whereby pressurized air carries the material through the outlet 84. Venting of air is provided using the air passageways 114a, 114b, as well as the openings 106a, 106b so that air is able to vent from the chute 14 to the outside environment.

The foregoing description of the invention has been presented for purposes of illustration and description. Further, the description is not intended to limit the invention to the form disclosed therein. Consequently, variations and modifications commensurate with the above teachings, and skill or knowledge in the relevant art are within the scope of the present invention. The preferred embodiment described hereinabove is further intended to explain the best mode known of practicing the invention and to enable others skilled in the art to utilize the invention in various embodiments and with the various modifications required by their particular applications or uses of the invention. It is intended that the appended claims be construed to include alternative embodiments to the extent permitted by the prior art.

I claim:

1. A feeding apparatus using pressurized air, comprising:
   container means for containing material;
   tine means disposed in said container means for engaging the material during its movement in said container means;
   adjusting means for controlling the size of an inlet through which the material passes, said adjusting means including first and second inlet adjusting means, said second inlet adjusting means being located on a side of said container means opposite a side of said container means having said first inlet adjusting means, said first and second inlet adjusting means cooperating to define said inlet and cooperating to define a predetermined angle which remains substantially the same regardless of the size of said inlet;
   feeder means for receiving material from said inlet and also receiving pressurized air, wherein pressurized air is used to carry the material from said feeder means; and
   air passageway means provided adjacent to said adjusting means and spaced from said feeder means for permitting the venting of air from said container means.

2. An apparatus, as claimed in claim 1, wherein:
   said predetermined angle is about 120°.

3. An apparatus, as claimed in claim 1, wherein:
   said air passageway means includes first air passageway means disposed adjacent to said first inlet adjusting means and a second air passageway means disposed adjacent to said second inlet adjusting means.

4. An apparatus, as claimed in claim 1, wherein:
   said tine means includes a first tine assembly and a second tine assembly, each of said tine assemblies including a rotating shaft and a number of tine members extending from said rotating shaft and wherein said rotating shafts of said first and second tine assemblies are substantially located in the same vertical plane.

5. An apparatus, as claimed in claim 1, wherein said container means includes:
   a hopper having a rotating conveyer; and
   a chute having a reduced lateral size in connection with said hopper and having said tine means, said adjusting means and said feeder means.

6. A feeding apparatus using pressurized air, comprising:
   container means containing material;
   tine means disposed in said container means for engaging the material during its movement in said container means;
   adjusting means for controlling the size of an inlet through which the material passes, said adjusting means including first and second inlet adjusting means, said second inlet adjusting means being located on a side of said container means opposite a side of said container means having said first inlet adjusting means, said first and second inlet adjusting means cooperating to define said inlet, said first inlet adjusting means including:
   a linearly movable adjustable plate; and
   crank means operatively connected to said adjustable plate, wherein rotation of said crank means causes movement of said adjustable plate in order to vary the size of said inlet;
   feeder means for receiving material from said inlet and also receiving pressurized air, wherein pressurized air is used to carry the material from said feeder means; and
   air passageway means provided adjacent to said adjusting means and spaced from said feeder means for permitting the venting of air from said container means.

7. An apparatus, as claimed in claim 6, wherein:
   said air passageway means is defined adjacent to a bottom surface of said adjustable plate near said inlet.

8. A feeding apparatus using pressurized air, comprising:
   container means for containing material;
   tine means disposed in said container means for engaging the material during its movement in said container means;
   adjusting means for controlling the size of an inlet through which the material passes;
   feeder means for receiving material from said inlet and also receiving pressurized air, wherein pressurized air is used to carry the material from said feeder means, said feeder means including:
   vane means for engaging the material; and
   body means positioned about said vane means and including a channel formed in an upper portion of said body means and being in communication with said inlet,
   said body means receiving pressurized air and wherein said body means includes an outlet through which pressurized air and material passes and an inlet through which pressurized air enters said body means, said body means being substantially imperforate except for said inlet, said outlet and said channel; and
   air passageway means provided adjacent to said adjusting means and spaced from said feeder means for permitting the venting of air from said container means.

9. A feeding apparatus using pressurized air, comprising:
   container means for containing material;
   tine means disposed in said container means for engaging material during its movement in said container means;
   first inlet adjusting means provided on a first side of said container means, said first inlet adjusting means including a linearly movable adjustable plate;
   second inlet adjusting means positioned on a second side of said container means opposite said first side, said second inlet adjusting means including a linearly movable adjustable plate and wherein said adjustable plates of said first and second inlet adjusting means cooperate to define an inlet through which the material passes from said tine means; and
   feeder means for receiving material from said inlet and also receiving pressurized air, wherein pressurized air is used in carrying the material from said feeder means to a desired location.

* * * * *